PULSE TIMING CONTROL CIRCUIT

Filed June 25, 1958 2 Sheets-Sheet 1

Inventor
NORMAN RAVER
By Philip M. Bolton
Attorney

Aug. 7, 1962 N. RAVER 3,048,708

PULSE TIMING CONTROL CIRCUIT

Filed June 25, 1958 2 Sheets-Sheet 2

Inventor
NORMAN RAVER
By Philip M. Bolton
Attorney 3,048,708

PULSE TIMING CONTROL CIRCUIT

Norman Raver, East Orange, N.J., assignor to International Telephone and Telegraph Corporation, Nutley, N.J., a corporation of Maryland Filed June 25, 1958, Ser. No. 744,360
6 Claims. (Cl. 307—88.5)

This invention relates generally to pulse delay circuits, and more particularly to such delay circuits utilizing trigger devices.

Various pulse delay circuits are known which utilize trigger circuits in the form of multivibrators and the like, and it is desirable to improve their stability, and their independence of circuit parameters—such as power supply voltage, changeable components, and the like.

An object of the present invention is to provide pulse delay circuits which are stable and independent of fluctuations in supply voltages and changeable parameters of circuit components.

A further object of the invention is to provide stable and adjustable pulse delay circuits such that the pulse delay time can be adjusted linearly to provide unlimited dynamic range.

A further object of the invention is to provide stable and adjustable pulse delay circuits with fast recovery times.

In accordance with the present invention, the pulse delay circuit comprises a constant current source connected to a charging condenser to provide a linear timing waveform, in combination with a bistable flip-flop and a comparator circuit which compares the input voltage with a reference level. The flip-flop is clamped to the charging condenser, and is set by a start trigger pulse. The comparator circuit then triggers at a predetermined potential to reset the flip-flop and terminate the charging cycle, whereupon an output pulse with a desired time delay is derived from the flip-flop.

The novel features that are considered characteristic of this invention are set forth with particularity in the appended claims. The invention itself, however, both as to its organization and mode of operation, as well as additional features and advantages, will best be understood from the following description when read in connection with the accompanying drawings, in which:

Figures 1, 2:
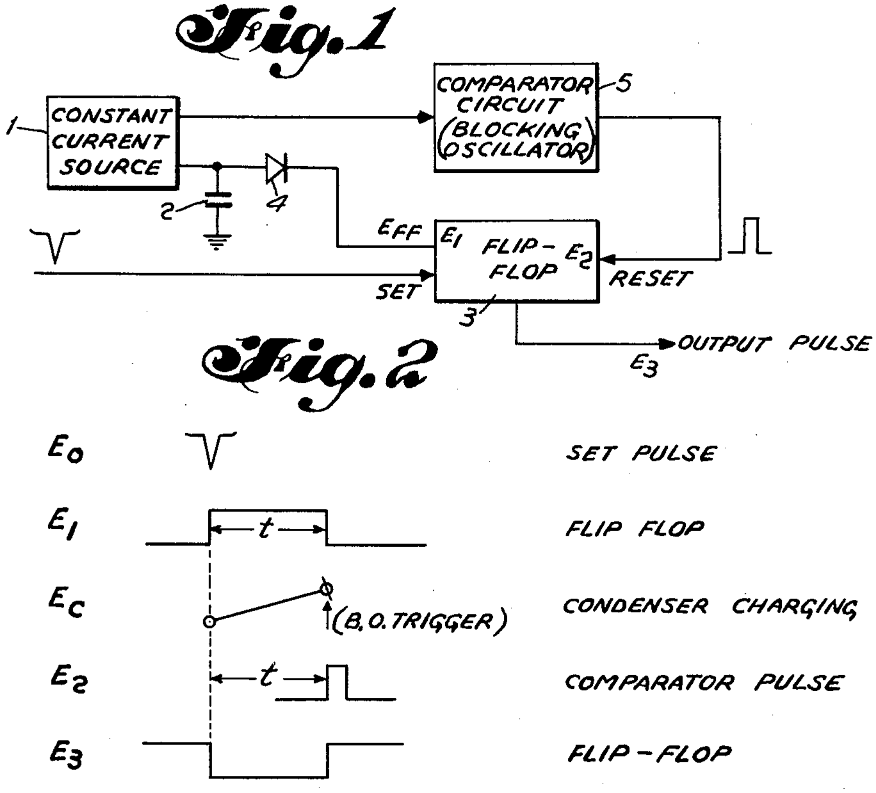
FIG. 1 is a block diagram of a pulse delay circuit in accordance with the present invention.
FIG. 2 is a graph illustrating waveforms associated with the pulse delay circuit of FIG. 1.

Referring to FIG. 1 of the drawing, there is illustrated, in block diagram form, a pulse delay circuit in accordance with the invention. A constant current source 1, provides a direct current characterized by high stability and linearly dependent on the supply voltage. A precision potentiometer, connected to the source provides a variable voltage.

The constant current source 1 serves to charge a condenser 2 connected thereto which is clamped to a flip-flop trigger circuit 3, by means of a diode 4. The flip-flop 3 may be a bistable multivibrator or the like, which is set by an incoming triggering pulse and reset from a comparator circuit 5, which may be a blocking oscillator connected to the constant current source, or other equivalent triggering circuit.

The comparator circuit 5 is made to trigger at a voltage level linearly dependent on the B+ voltage. The effect of variations in B+ voltage on the pulse width are thereby cancelled out.

The output pulse is derived from the multivibrator or flip-flop 3 and is characterized by a delay time T with respect to a sharp input pulse, which sets the flip-flop 3. The width of the output pulse, which is a measure of the time delay, may be adjusted by means of the variable precision potentiometer 14 located in the constant current source 1.

FIG. 2 shows the pulse waveforms present at key points of the pulse delay circuit. The sharp triggering pulse $E_0$ represents the incoming start pulse, which initiates the cycle by setting the bistable flip-flop circuit 3 to the conductive state. The condenser charges linearly during period T as represented by waveform $E_c$. At the end of this period T, the comparator circuit triggers to provide a pulse $E_2$, which resets the flip-flop. The output pulse $E_3$ derived from the flip-flop is delayed for a time characterized by time T.

Figure 3:
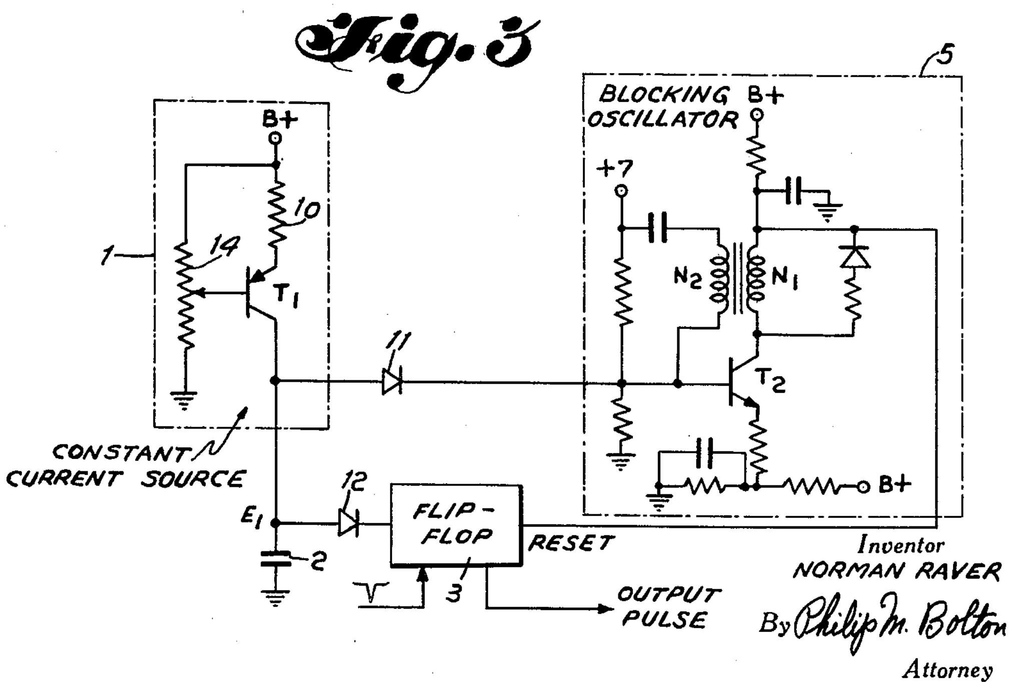
FIG. 3 is a simplified pulse delay circuit corresponding to the diagram of FIG. 1.

FIG. 3 shows a transistorized pulse delay circuit in accordance with the invention.

The constant current source 1 comprises a source of positive D.C. potential B+ connected to transistor $T_1$ by a resistor 10 connected to its emitter. The variable potentiometer 14 is connected to the base electrode of transistor $T_1$, while the collector is clamped by a diode 11 to the comparator circuit 5, shown as a transistorized blocking oscillator.

The charging condenser 2 connected to the constant current source 1 is clamped to a flip-flop trigger circuit 3, such as a bistable multivibrator.

The comparator circuit 5, which is shown as a transistor blocking oscillator in FIG. 3, may assume various other forms, such as the multiar circuit illustrated in the M.I.T. Radiation Lab. Series, vol. 19, entitled, "Wave Forms," p. 343, published 1949 by McGraw-Hill Book Co., Inc., N.Y.

In the quiescent state, point $E_1$ is clamped by one side of the flip-flop circuit 3 to a fixed negative voltage. When the pulse delay circuit is initially triggered by a narrow, incoming pulse $E_0$, the clamp point suddenly rises in potential, and the rise is linear as the constant current source charges up condenser 2. When the point reaches the reference voltage of the comparator (i.e. a like fixed positive voltage), the comparator circuit triggers to provide a reset pulse. The flip-flop 3 is thereby reset and the condenser 2 is discharged by the flip-flop alternation of its bistable states.

The delayed output pulse $E_3$ can be easily adjusted to provide a variable delay time T by the adjustment of potentiometer 14, which varies the voltage of the constant source 1.

Figure 4:
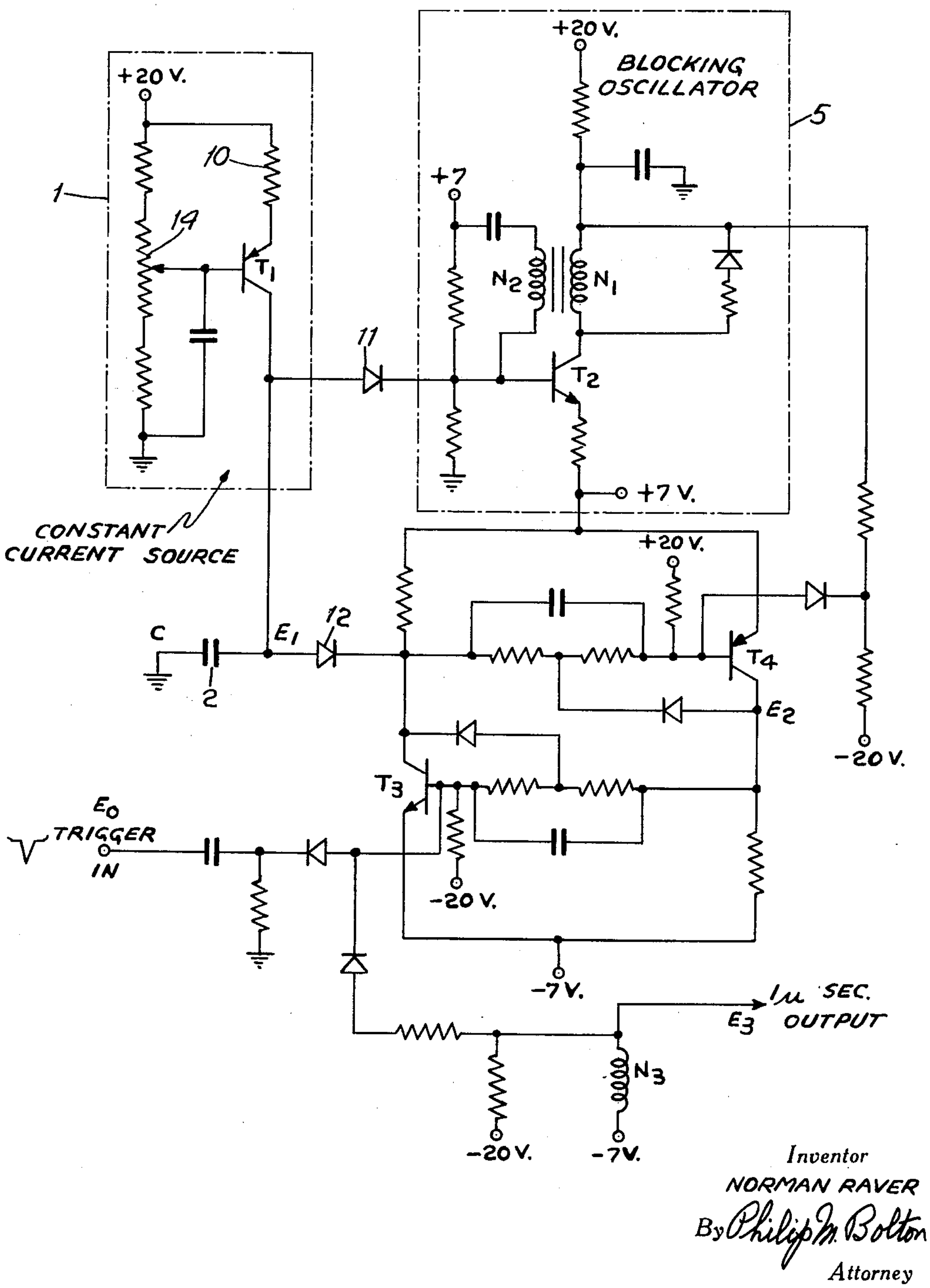
FIG. 4 is a schematic of a pulse delay circuit illustrating a practical embodiment in accordance with the invention.

FIG. 4 shows a circuit schematic of a practical embodiment of the invention. The flip-flop circuit shown in block form in FIG. 3 is illustrated as a transistor form of multivibrator, comprising transistors $T_3$ and $T_4$, with the circuit interconnections for altering the bistable conductive and non-conductive states thereof in the well-known manner. As previously disclosed, the delay time of output pulse $E_3$ can be easily adjusted by the variable potentiometer 14. The only major recovery time is the discharge of condenser 2, which is provided by the output of the blocking oscillator 5 and the transistor $T_3$ of the flip-flop. In the pulse delay circuits disclosed herein, two waveforms, a delayed narrow pulse and a variable width square pulse are available as waveforms $E_2$ and $E_3$, respectively, for application in computers, pulse communication circuits or the like.

It should be understood that it is within the purview of the invention to utilize a storage inductance and a constant voltage source in lieu of the constant current source and charging condenser hereindisclosed without departing from the spirit of the invention.

I claim:

1. A pulse delay circuit comprising a constant current source, a condenser coupled to said source to be linearly charged thereby, circuit means for discharging said condenser including a bistable multivibrator and means connected to said multivibrator to form a discharge path therethrough in the first of its stable states, a source of triggering pulses, means coupling said source of triggering pulses to said bistable multivibrator circuit to flip it from its first to its second stable state to block said discharge path and permit the potential of said condenser to gradually rise, a comparator circuit coupled to said condenser and adapted to produce an output when the voltage on said condenser reaches a predetermined level, means coupling the output of said comparator circuit to said bistable circuit to restore said bistable circuit to its first stable state and discharge said condenser, and output circuit means coupled to said bistable multivibrator to derive therefrom an output pulse having a duration corresponding to the time said bistable circuit is in its second stable state.

2. A pulse delay circuit comprising a constant current source and a grounded charging condenser connected to be charged by said source to provide a linear timing waveform, a bistable multivibrator and a blocking oscillator comparator each unilaterally coupled to said constant current source and condenser, means for triggering the blocking oscillator when the charge on said condenser reaches a predetermined potential to provide a pulse for resetting said bistable multivibrator to a first stable state, said multivibrator forming a discharge path therethrough for said condenser in said first stable state, an independent source of trigger pulses connected to said multivibrator to switch said transistor into its second stable state and block said discharge path and permit said condenser to charge, and means to derive a delayed output pulse from said multivibrator of a duration controlled by the charge time of said condenser.

3. The pulse delay circuit of claim 1, wherein said multivibrator comprises a pair of transistors coupled for alternation of their conductive and non-conductive states, one transistor thereof being unilaterally connected to said condenser for discharging it.

4. The pulse delay circuit of claim 2, and a pair of clamping diodes, one diode clamping said constant current source to the said bistable multivibrator and the other diode independently clamping the constant current source to said blocking oscillator.

5. The circuit of claim 2 wherein the constant current source comprises a source of direct-current potential and a transistor coupled thereto, having a base, collector and emitter electrodes, said transistor coupled to said multivibrator, and a variable potentiometer for varying the delay time of said output pulse, said potentiometer being connected to the base of said transistor.

6. The pulse delay circuit of claim 1 including means for controlling said constant current source to provide an adjustable time delay for said multivibrator output pulse.

References Cited in the file of this patent

UNITED STATES PATENTS

| | | |
|---|---|---|
| 2,551,280 | Moe | May 1, 1951 |
| 2,572,080 | Wallace | Oct. 23, 1951 |
| 2,789,267 | Beal et al. | Apr. 16, 1957 |
| 2,827,568 | Altschul | Mar. 18, 1958 |
| 2,845,548 | Silliman et al. | July 29, 1958 |
| 2,849,626 | Klapp | Aug. 26, 1958 |
| 2,898,557 | Dahlin | Aug. 4, 1959 |
| 2,949,547 | Zimmermann | Aug. 16, 1960 |